(12) United States Patent
Itagaki

(10) Patent No.: US 7,791,735 B2
(45) Date of Patent: Sep. 7, 2010

(54) POINTING DEVICE

(75) Inventor: Nobutaka Itagaki, Tokyo (JP)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 391 days.

(21) Appl. No.: 12/036,098

(22) Filed: Feb. 22, 2008

(65) Prior Publication Data

US 2008/0204761 A1    Aug. 28, 2008

(30) Foreign Application Priority Data

Feb. 26, 2007    (JP)    ............... 2007-045450

(51) Int. Cl.
*G01B 9/02*    (2006.01)
*G09G 5/08*    (2006.01)
(52) U.S. Cl. ...................... 356/498; 345/166
(58) Field of Classification Search .............. 356/496, 356/498; 345/166
See application file for complete search history.

(56) References Cited

U.S. PATENT DOCUMENTS

| 4,647,771 | A | 3/1987 | Kato |
| 6,281,882 | B1 | 8/2001 | Gordon et al. |
| 6,741,234 | B2 * | 5/2004 | Son ........................... 345/166 |
| 7,442,916 | B2 * | 10/2008 | Lee et al. ..................... 250/221 |
| 7,474,297 | B2 * | 1/2009 | Moyer et al. ................. 345/163 |
| 7,511,825 | B2 * | 3/2009 | Itagaki ........................ 356/498 |
| 2002/0080121 | A1 * | 6/2002 | Son ............................. 345/166 |
| 2004/0246232 | A1 * | 12/2004 | Chang et al. ................. 345/163 |
| 2005/0024336 | A1 | 2/2005 | Xie et al. |
| 2005/0024623 | A1 | 2/2005 | Xie et al. |
| 2005/0259098 | A1 | 11/2005 | Trisnadi et al. |
| 2007/0008286 | A1 | 1/2007 | Theytaz et al. |
| 2007/0291001 | A1 * | 12/2007 | Trisnadi et al. ............. 345/166 |
| 2007/0291272 | A1 | 12/2007 | Itagaki |

FOREIGN PATENT DOCUMENTS

| GB | 2429280 | 2/2007 |
| JP | 2001125732 | 10/1999 |
| JP | 11-345075 | 12/1999 |
| JP | 2004-246921 | 2/2004 |
| JP | 2005-050349 | 2/2005 |
| WO | WO-2007/149222 | 12/2007 |

* cited by examiner

*Primary Examiner*—Samuel A Turner

(57) ABSTRACT

There is provided a pointing device including a light source that provides incident light for illuminating a front surface of a substrate at a predetermined angle of incidence, the substrate having a rear surface as well as the front surface and being transparent to the wavelength of the incident light, a detector that detects the intensity of speckle light from the front and rear surfaces, the speckle light generated from the incident light, and legs that are in contact with the substrate and charge the front surface of the substrate through friction between the legs and the substrate.

11 Claims, 4 Drawing Sheets

(A)

(B)

(C)

POINTING DEVICE

CROSS REFERENCE TO RELATED APPLICATIONS

This application is entitled to the benefit of Japanese patent application 2007-045450, filed Feb. 26, 2007, which is incorporated by reference herein.

TECHNICAL FIELD

The present invention relates to a device for optically detecting motion, and particularly to an optical pointing device or an optical navigation device used as a peripheral apparatus connected to a personal computer etc.

BACKGROUND

Patent Document 1—Japanese Patent No. 3771081, Application No. 11-086460.
Patent Document 2—Japanese Patent Laid-Open No. 2005-50349.
Patent Document 3—Japanese Patent Laid-Open No. 2004-246921.

Patent Document 1 discloses a non-mechanical or optical mouse and a pointing device that are currently commercially available. Such a device emits light and illuminates an operation plane at a small angle of incidence, 70° to 85°, and detects fine texture of the surface based on highlighted and shaded portions. An LED is generally used to produce light, while in some cases, a laser diode (VCSEL, in particular) is used to improve the performance of identifying the fine texture.

Patent Document 2 describes a pointing device including an optical motion detection circuit that determines the amount of movement by emitting infrared light and detecting correlation between images based on the reflected light from a surface. The motion detection circuit (pointing device) correlates a reference frame formed of digitized output values of the reflected light obtained from an optical detector with a sample frame formed of digitized output values obtained subsequent to the reference frame so as to check the motion in a predetermined direction.

A known pointing device currently commercially available is, for example, a motion detection device described in Patent Document 3. This device includes a light source that produces coherent light, such as a laser diode, and a navigation sensor. The device detects reflected light of the light from the light source to determine the amount of movement of the pointing device (a mouse, for example).

The pointing device described in Patent Document 2 or Patent Document 3 may not correctly operate or may malfunction when used on a surface made of glass material. This results from the fact that an equivalent of the fine texture detectable in Patent Documents 2 and 3 will not be detected because the glass material has extremely few surface irregularities. Furthermore, the fact that surface roughness of the glass surface, measuring about a few nanometers, is much smaller than not only the wavelength of the incident light but also each pixel in the optical detector also contributes to the difficulty in detecting fine texture.

The signal intensity of the reflected light described above will now be briefly explained. In general, to detect the intensity of light reflected from a substrate surface having certain surface roughness as grayscale variation, the size of the grayscale variation needs to be larger than the wavelength of the light and substantially the same as the size of a pixel used for detection.

Since the surface roughness of a glass material is extremely small, that is, about a few nanometers, it is difficult to detect the amount of change in intensity of the light reflected from such a surface with high sensitivity.

In specular reflection, the intensity of reflected light is basically equal to the intensity of incident light, but varies according to the reflection coefficient of the surface when its material is glass or the like (the reflection coefficient depends on the polarization direction and the angle of incidence of the light). Letting R be the reflection coefficient and $I_{IN}$ be the intensity of the incident light, the average intensity $I_R$ of the reflected light is expressed by the following equation:

$$I_R = R \times I_{IN} \qquad \text{(Equation 1)}$$

In general, the average intensity $I_d$ of speckle light emitted from the surface is expressed by the following equation:

$$I_d \cong (4\pi\sigma/\lambda)^2 \times I_R \qquad \text{(Equation 2)}$$

There is a need for a pointing device, such as an optical mouse, that can be used on a smooth substrate made of glass or the like.

SUMMARY OF THE INVENTION

The present invention provides a pointing device that accurately operates even on a substrate having extremely small surface roughness by using an aperture to superimpose reflected light from the front and rear surfaces of the substrate on a detector.

Specifically, there is provided a pointing device including a light source that provides incident light for illuminating a front surface of a substrate at a predetermined angle of incidence, the substrate having a rear surface as well as the front surface and being transparent to the wavelength of the incident light;

a detector that detects the intensity of speckle light from the front and rear surfaces, the speckle light generated from the incident light; and legs that are in contact with the substrate and charge the front surface of the substrate through friction between the legs and the substrate. A navigation system thus using speckle light, compared with a method using reflected light, has an advantage of having an ability to detect very small surface roughness although the signal level of the speckle light is small.

The term "speckle light" means the light obtained from a specific pattern formed by irregularities on the front or rear surface of an object when the object is illuminated with light.

A preferred aspect of the pointing device according to the present invention further includes an aperture having an opening through which the speckle light passes, and the longitudinal direction of the opening lies in the direction of the angle of incidence so that the speckle light from the front surface overlaps with the speckle light from the rear surface on the detector. A preferred aspect of the opening of the pointing device is a rectangular opening extending in the longitudinal direction or a slit having an opening in the longitudinal direction. A preferred aspect of the pointing device further includes a lens for focusing or diverging the incident light from the light source. A preferred aspect of the light source is a laser light source. The laser light source is more preferably a vertical cavity surface emitting laser (hereinafter referred to as "VCSEL").

A preferred aspect of the pointing device further includes an optical filter or a lens between the aperture and the substrate because the optical filter can block external stray light and the lens allows more speckle light to be obtained from the substrate, so that the S/N ratio and hence the detection accuracy are improved.

According to the present invention, since not only reflected light from the front surface of the substrate but also reflected light from the rear surface are used, the signal intensity can be increased. Furthermore, movement of the pointing device causes friction between the legs and the substrate, so that the substrate is charged. Dust particles in the air are therefore attracted to the substrate to increase the apparent surface roughness of the substrate, allowing further increase in the signal intensity. Thus, even on a substrate having extremely small surface roughness, the pointing device is accurately operable and the tracking performance is improved.

Furthermore, the pointing device according to the present invention can be used not only on a transparent substrate but also on a substrate on which a typical optical mouse is operable, such as a white plate. In this case, speckle light to be detected primarily comes from the upper surface of the white plate.

DETAILED DESCRIPTION

Figure 1:
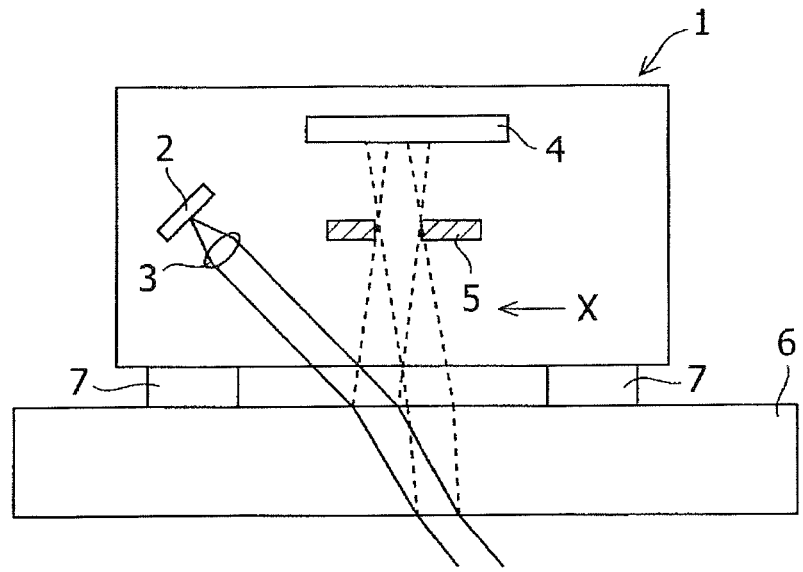
FIG. 1A is a cross-sectional view showing the structure of a pointing device 1 used to implement the present invention.
FIG. 1B is a perspective view showing the shape of the opening of an aperture 5 used in FIG. 1A.
Figure 1:
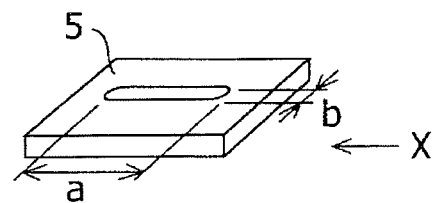

FIG. 1A shows a pointing device 1 used to implement the present invention. The pointing device 1 includes a laser light source 2, a lens 3 that is placed at an arbitrarily selected position and focuses or diverges the light from the light source 2, an optical detector 4 that receives speckle light obtained from the light incident from the light source 2 to a substrate 6 at a predetermined angle of incidence, an aperture 5 having an opening that passes part of reflected light from the substrate 6, and legs 7 that are in contact with the substrate 6 and support the pointing device 1.

The light source 2 can be, for example, a vertical cavity surface emitting laser (VCSEL). The light source 2 is not however limited to such a laser light source, but may be a coherent light source. The beam emitted from the light source 2 does not need to be collimated light like laser light (although collimated light has an advantage of providing the same tracking characteristic both in the X and Y axes). When uncollimated light is used, a cross-shaped aperture (not shown) having openings extending in the X and Y axes, respectively, and a laser diode and an optical detector (not shown) provided along each of the longitudinal directions of the cross-shaped aperture can be used. In this case, the laser diodes are, for example, alternately turned on to provide the same tracking characteristic in the X and Y axes. Alternatively, in such an arrangement, the two laser diodes can be simultaneously turned on to increase the power of the input beam and enhance the speckle signal.

A light source having a wavelength within a range from about 500 nm to about 1 μm can be used as the light source 2. In practice, an appropriate wavelength will be selected by taking into account the wavelength-sensitivity characteristic and the like of the optical detector 4. Longer wavelength is advantageous for measurement because the speckle size becomes larger, the speckle intensity will however be reduced as described above (Equation 2). It is thus preferable to select an appropriate wavelength in terms of the speckle size as well.

In general, the speckle size is inversely proportional to the reciprocal of the spot size on the illuminated surface or the reciprocal of the area of the speckle light after it is limited at the aperture. Thus, adjusting the lens in such a way that the position of the spot (focal point) coincides with the illuminated plane maximizes the spot size. A speckle size larger than the pixel size of the optical detector will not cause a serious problem, while a speckle size smaller than the pixel size may reduce the S/N. On the other hand, when the lens is adjusted so that the position of the spot (focal point) coincides with the illuminated plane, the speckle size can be maximized, while no navigation function may disadvantageously be obtained.

In practice, improvement in functionality of the overall system (such as a pointing device) can therefore be expected by replacing collimated light with light that is not perfectly collimated. Use of light that is not perfectly collimated increases the spot size on the operation plane and hence decreases the speckle size. To reduce the impact of the smaller speckle size, it is preferable to optimize the aperture size "b".

Use of both the aperture and an optical filter can eliminate or reduce the impact of external light (such as ambient light) incident from the lower part of the glass surface.

Alternatively, the radiation beam from the light source 2 may be arbitrarily adjusted with the lens 3 so that the spot size of the radiation beam becomes a desired size (about 0.1 mm to about 3 mm) when the radiation beam reaches the substrate 6.

As the optical detector 4 a device having a plurality of light receiving elements (pixels) arranged in rows and columns (such as a CMOS imager or a CCD) can be used, for example. Alternatively, the optical detector 4 may be a combination of a stripe sensor having its longitudinal direction in the X axis and a stripe sensor having its longitudinal direction in the Y axis.

The legs 7 are made of a material that charges the surface of the substrate 6 through friction between the legs 7 and the substrate 6. When the substrate 6 is made of glass, the legs 7 can be a material of triboelectric series on the negative side for positively charging the substrate 6, such as fluororesin (polytetrafluoroethylene), polyacetal resin (Derlin®), silicon, polyethylene and polyvinyl chloride (PVC). As the pointing device 1 moves, friction is generated between the substrate 6 and the legs 7. As a result, the substrate 6, when made of glass, is positively charged, so that negatively charged dust particles in air are attracted and attached to the substrate 6. This can therefore increase the apparent surface roughness of the substrate 6 and hence the intensity of the speckle signal.

FIG. 1B is a perspective view showing the shape of the opening of the aperture 5 used in FIG. 1A. To clarify the longitudinal direction of the opening of the aperture 5 in FIG. 1B, the character "X" indicative of the direction is shown both in FIGS. 1A and 1B. As shown in FIGS. 1A and 1B, the aperture 5 is placed in front of the optical detector 4 in such a way that the longitudinal direction of the opening of the aperture 5 lies in the traveling direction of the incident light emitted from the light source 2 at a predetermined angle of incidence. By thus placing the aperture 5, the same light receiving elements (pixels) in the optical detector 4 can receive the speckle light both from the front surface (or the upper surface) and the rear surface (or the lower surface) of the substrate 6. As a result, even when the surface roughness of the substrate 6 is extremely small, a large speckle signal can be obtained.

Figure 2:
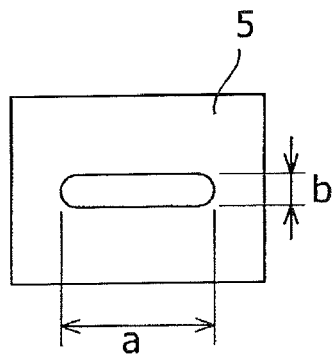
FIG. 2A and FIG. 2B are schematic views showing the shape of the opening of the aperture used to implement the present invention.
Figure 2:
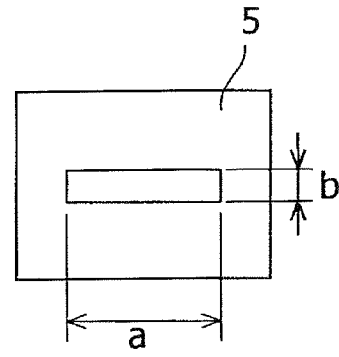

FIGS. 2A and 2B show the aperture 5 having the opening described above. The opening of the aperture in FIG. 2A has a length "a" in the longitudinal direction and a length "b" in the width direction, and the sides of the opening in the width direction are not straight but circular. The opening of the aperture in FIG. 2B is rectangular and has a length "a" in the longitudinal direction and a length "b" in the width direction.

Use of the aperture 5 shown in FIG. 2A or FIG. 2B allows the speckle light from the front and rear surfaces of the substrate 6 to be superimposed on the light receiving elements (pixels) in the optical detector 4, so that speckle light having higher intensity can be obtained.

The light that passes through the opening of the aperture 5 and then reaches the optical detector 4 has a shape that reflects the shape of the opening of the aperture 5 on the light receiving elements (pixels) in the optical detector 4 (with regard to the shape, see FIGS. 4A to 4C, which are described later). The shape of the opening of the aperture 5 is preferably rectangular shown in FIG. 2B from the viewpoint of effectively using (rectangular) pixels that form the optical detector 4.

The width of the opening of the aperture 5 may be of substantially the same size as the light receiving surface of the optical detector 4. A wider opening increases the amount of light that the optical detector 4 receives and hence improves the S/N ratio of the signal intensity, while reducing the magnitude of speckle. Thus, when each of the light receiving elements that form the optical detector 4 is large, the variation in the speckle light is averaged in each pixel, resulting in a poorer S/N ratio in some cases.

Figure 3:
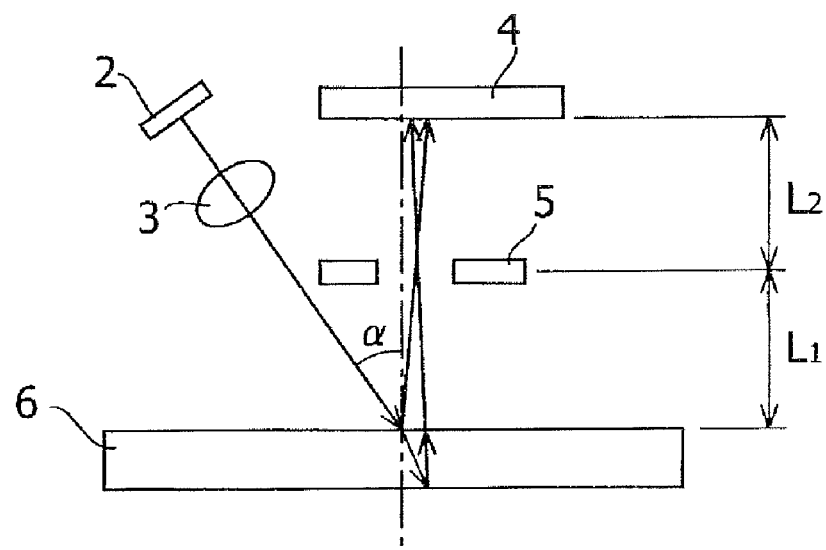
FIG. 3 is a cross-sectional view showing the internal structure of the pointing device 1 shown in FIG. 1, the position of the aperture 5, and the paths of the reflected light from the front and rear surfaces of a substrate 6.

For example, in FIG. 3, it is preferable to set the distance L1 to 3 mm to 20 mm, the distance L2 to 2 mm to 10 mm, the angle of incidence α to 30° to 70°, the width of the aperture to 1 mm and the length of the aperture to 2 mm to 4 mm.

An optical filter (not shown) for blocking external stray light, a lens (not shown) for increasing the speckle light from the substrate or the like may be further inserted between the aperture 5 and the substrate 6. The optical filter is necessary when the pointing device is operated under the presence of ambient light.

According to the pointing device 1 described above, not only the signal component of the speckle light from the front surface of the substrate 6 but also the signal component of the speckle light from the rear surface of the substrate 6 can be detected at the same light receiving elements (pixels) in the optical detector 4. The intensity of the signal detected with the optical detector 4 can therefore be substantially doubled. In the case of a glass desk, only the front side (or the upper side) of the glass is often polished. The surface roughness of the rear side of the glass is thus often larger than that of the front side, so that the signal of the speckle light from the rear side of the glass may be higher than that from the front surface.

A brief description will be made of how to determine the signal intensity obtained by the light receiving elements (pixels) in the portion where the speckle light from the front surface overlaps with the speckle light from the rear surface on the optical detector 4. The optical detector 4 detects the speckle light described above and produces digitized pixel output values called a "reference frame." Subsequent to the "reference frame", the optical detector 4 produces digitized pixel output values called a "sample frame." These output values are stored in a memory (not shown). Pixel-to-pixel grayscale variations and the amount of light will be calculated from the pixel outputs. When the amount of light thus calculated is equal to or smaller than a fixed value, the pointing device is judged to be apart from the substrate 6, otherwise the pointing device is judged to be close to the substrate 6 and be successfully tracked. In this case, the correlation value between the "reference frame" and the "sample frame" is calculated, and the amount of difference between the reference frame and the sample frame is predicted to output the amounts of difference Δx and Δy.

Then, it is judged whether or not the "reference frame" is replaced, and a new reference frame will be obtained as required. The process then returns to the step "Obtain a sample frame", and similar measurement will be repeated.

In the following example, a description will be made of a case where the pointing device 1 described above is used on the substrate 6 made of glass material. It is noted that the material of the substrate 6 is not limited to the glass material described above, but may be other materials as long as they are transparent to the wavelength of the light emitted from the light source 2.

An example of the pointing device 1 according to the present invention will be described with reference to FIG. 3. In this example, a VCSEL having a wavelength of 665 nm was used as the light source 2 in the pointing device 1. The beam emitted from the light source 2 was incident on the substrate 6 through the lens 3 at an angle of incidence α (about 50°). A 10 mm-thick glass substrate was used as the substrate 6. A CCD in which 1024 by 768 pixels, each pixel being a 4.6 μm by 4.6 μm square, were arranged in a matrix was used as the optical detector 4 for receiving speckle light from the substrate 6. The aperture shown in FIG. 2A was used as the aperture 5. The opening of the aperture had a length "a" of 2 mm in the longitudinal direction and a length "b" of 1 mm in the width direction. The legs 7 of the pointing device 1 were made of Derlin®.

The distance L1 from the surface of the substrate 6 to the aperture 5 was 8 mm, and the distance L2 from the aperture 5 to the light receiving surface of the optical detector 4 was 4 mm. The distances are not limited these values, but other values can also be selected.

In the example shown in FIG. 3, although the optical detector 4 is disposed parallel to the operation plane (substrate surface), the way the optical detector 4 is disposed is not limited thereto. For example, the orientation of the optical detector 4 may be adjusted according to the angle of the reflected light from the operation plane (substrate surface).

Although FIG. 3 shows a configuration in which the optical detector 4 and the aperture 5 are disposed above the operation plane (substrate surface) in the direction substantially perpendicular thereto, the way the optical detector 4 and the aperture 5 are disposed is not limited thereto. For example, the optical detector 4 and the aperture 5 may be disposed at a predetermined angle other than the right angle.

The average speckle size is given by f (F-number)×λ (wavelength) and about 8 μm in the configuration of the device shown in FIG. 3. On the other hand, the device will be operable even when the pixel size of the optical detector is larger than this speckle size. In this case, however, the detection sensitivity (S/N ratio) of the optical detector may be slightly lowered.

Figure 4:
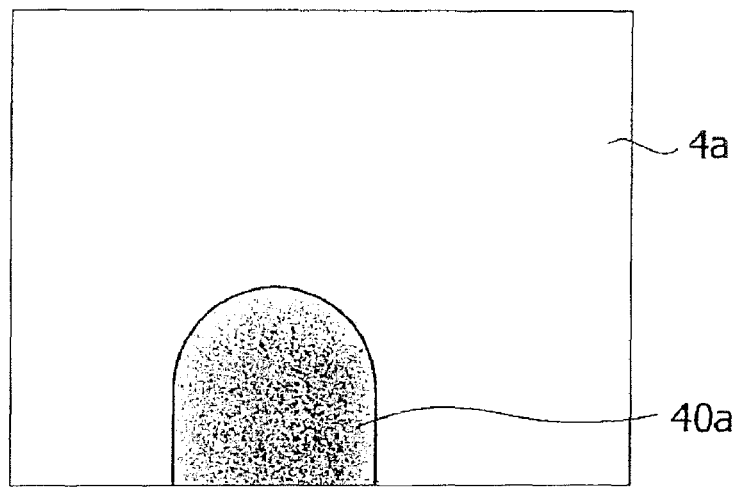
FIG. 4A is a photograph obtained by using a CCD described in Example to image speckle light from the front surface of the substrate 6.
FIG. 4B is a photograph obtained by using the CCD described in Example to image speckle light from the rear surface of the substrate.
FIG. 4C is a photograph obtained by using the CCD described in Example to image the speckle light from both the front and rear surfaces of the substrate 6.
Figure 4:
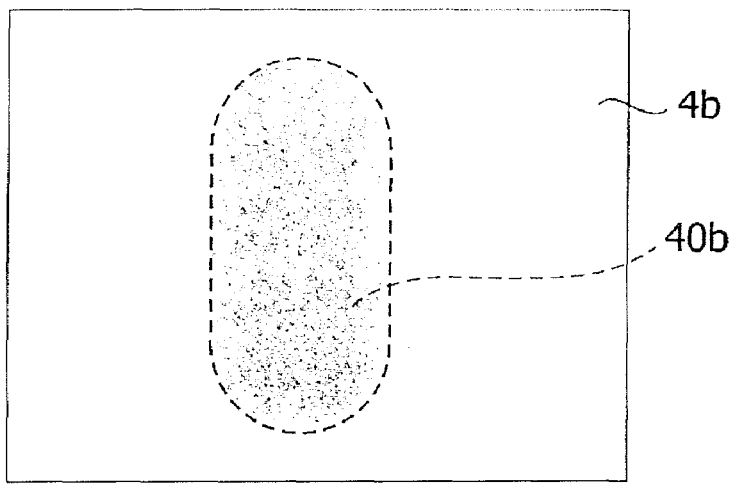
Figure 4:
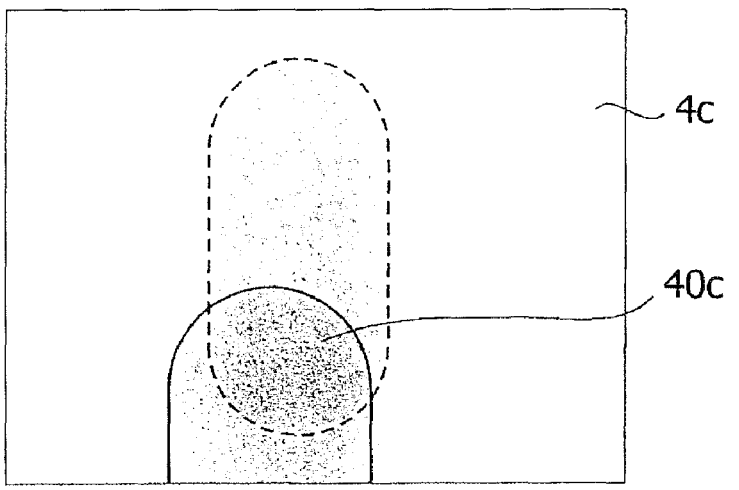

FIGS. 4A to 4C show images illustrating the signal intensity of the speckle light obtained by the optical detector 4 under the condition corresponding to FIG. 3. It is noted that the positive and negative (black and white) dots in the actual images are displayed in a reversed manner for clarity (that is, black portions in the images have higher light intensities).

FIG. 4A shows an image (4a) obtained when the optical detector 4 detects the speckle light from the front surface of the substrate 6. In the figure, the speckle light from the front surface corresponds to the region (40a) surrounded by the solid line. FIG. 4B shows an image (4b) obtained when the optical detector 4 detects the speckle light from the rear surface of the substrate 6. In the figure, the speckle light from the rear surface corresponds to the region (40b) surrounded by the broken line. FIG. 4C shows an image in which the speckle light from the front surface of the substrate 6 overlaps with the speckle light from the rear surface. In the figure, the portion where the speckle light from the front surface overlaps with the speckle light from the rear surface corresponds to the region (40c) surrounded by the solid line and the broken line. As shown in FIG. 4C, the detection sensitivity (S/N ratio) of the optical detector 4 was improved by using the aperture 5 to superimpose the speckle light from the front and rear surfaces of the substrate 6 as compared to the case where only the speckle light from the front surface was detected. As a result, even on the smooth transparent substrate made of glass material or the like, the motion of the pointing device 1 was successfully detected in an accurate manner based on the speckle light from the substrate 6.

Figure 5:
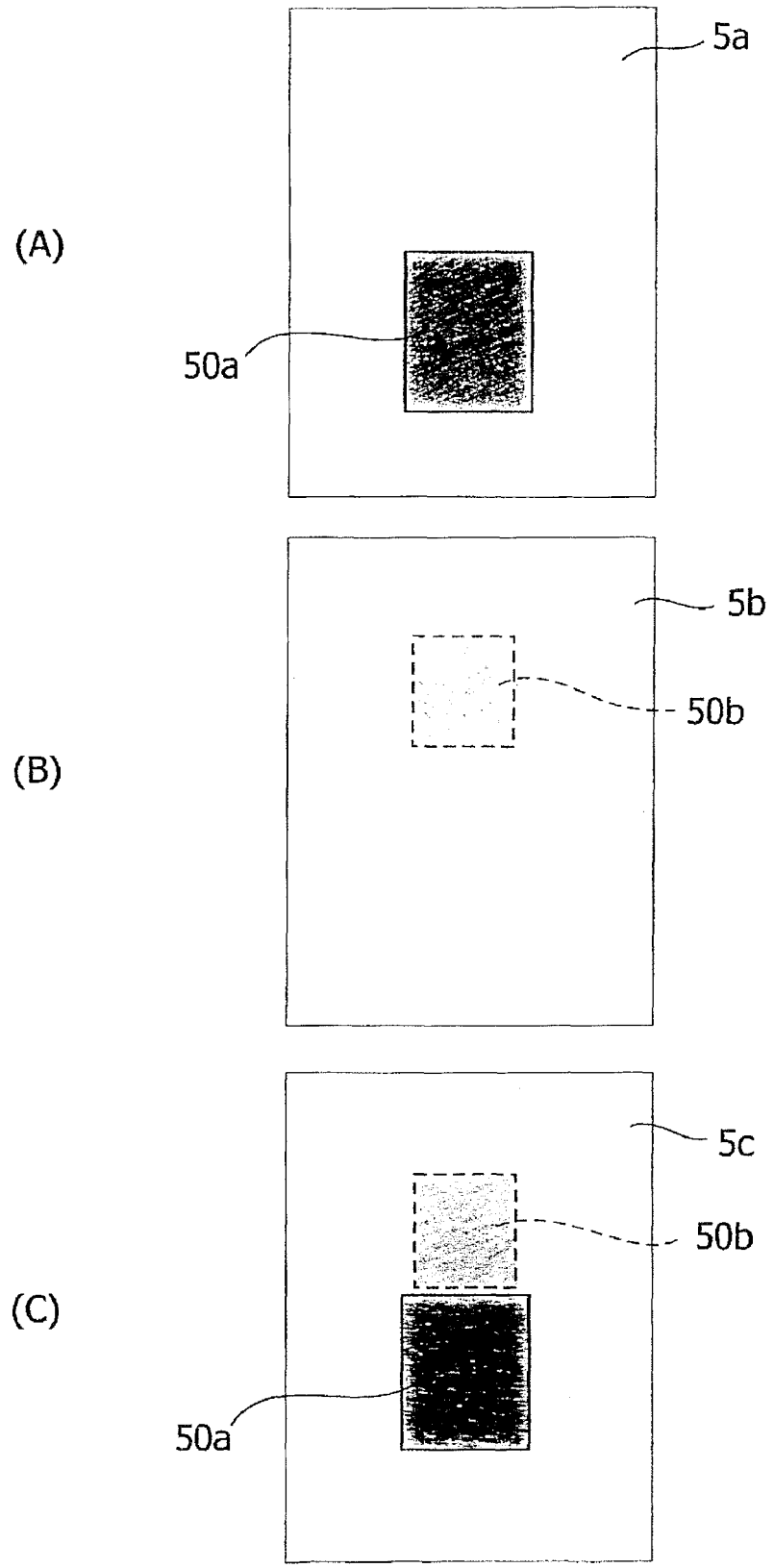
FIG. 5A is a photograph obtained by using the CCD, as in FIG. 4, to image speckle light from the front surface of the substrate 6 through an square aperture (corresponding to a conventional aperture)
FIG. 5B is a photograph obtained by using the CCD, as in FIG. 4, to image speckle light from the rear surface of the substrate through the square aperture (corresponding to a conventional aperture)
FIG. 5C is a photograph obtained by using the CCD, as in FIG. 4, to image the speckle light from both the front and rear surfaces of the substrate 6 through the square aperture (corresponding to a conventional aperture).

On the other hand, FIGS. 5A to 5C show the results obtained by measuring the same surface portion of the same substrate 6 through a square aperture (1 mm by 1 mm square) corresponding to a conventional aperture. FIG. 5A shows an image (5a) obtained when the optical detector 4 detects the speckle light from the front surface of the substrate 6. In the figure, the speckle light from the front surface corresponds to the region (50a) surrounded by the solid line. FIG. 5B shows an image (5b) obtained when the optical detector 4 detects the speckle light from the rear surface of the substrate 6. In the figure, the speckle light from the rear surface corresponds to the region (50b) surrounded by the broken line. FIG. 5C corresponds to an image obtained from the speckle light from the front and rear surfaces of the substrate 6. As shown in FIG. 5C, it is found that when the aperture corresponding to the conventional aperture was used, the speckle light (50a) from the front surface of the substrate 6 does not overlap with the speckle light (50b) from the rear surface.

Whether or not the speckle light from the front surface overlaps with the speckle light from the rear surface depends on the thickness of the substrate 6. However, considering that the thickness of the glass substrate used for a table or the like is generally about 10 mm to 15 mm, when the square aperture described above (corresponding to the conventional aperture) is used, the speckle light from the front and rear surfaces will not overlap each other. It is therefore proved that the aperture according to the present application provides an extremely advantageous effect.

In the above example, the description has been made of the use of the aperture 5 having one opening extending both in the longitudinal and width directions. The aperture 5 is not however limited thereto. For example, it is possible to use an aperture having an opening formed by arranging a number of small circular or square openings in the longitudinal direction.

In general, considering the thickness of a typical glass substrate (within a range from 10 mm to 15 mm), it is noted that when a pinhole-shape aperture disposed in front of the optical detector is used to simply improve the S/N ratio, the same light receiving elements in the optical detector cannot receive reflected light both from the front and rear surfaces (that is, reflected light from the front and rear surfaces will not overlap each other on the light receiving elements). On the other hand, there is a commercially available optical mouse having an opening elongated in the longitudinal direction (an elliptical opening, for example). The opening of such an optical mouse however is configured to guide more reflected light from the front surface of the substrate (obliquely incident on the opening) to the light receiving elements, but not configured to superimpose the speckle light (scattered light) from the front and rear surfaces of the substrate on the light receiving elements.

On the other hand, to measure the speckle light from the upper and lower surfaces, it is conceivable to use an aperture having a large opening or not to use an aperture itself In this case, although the speckle light from both surfaces can be measured, the contrast of the speckle light is reduced due to background light (such as ambient light). This is also true even when an optical filter (BPF) is used. Some kind of aperture is thus necessary from the viewpoint of improving the contrast of the speckle light. In the example described above, use of the optical filter (BPF) and the aperture can prevent reduction in contract due to background light (such as ambient light).

In the above description, the pointing device 1 used to implement the present invention has been described only by way of example. To implement the present invention set forth in the claims, it should be understood that those skilled in the art apparently recognize that a large number of device configurations different from the device configuration described above can be employed.

What is claimed is:

1. A pointing device comprising:
    a light source that provides incident light for illuminating a front surface of a substrate at a predetermined angle of incidence, the substrate having a rear surface as well as the front surface and being transparent to the wavelength of the incident light;
    a detector that detects the intensity of speckle light from the front and rear surfaces, the speckle light generated from the incident light; and
    legs that are in contact with the substrate and charge the front surface of the substrate through friction between the legs and the substrate.

2. The pointing device according to claim 1, wherein the legs are made of fluororesin, polyacetal resin, silicon, polyethylene, or polyvinyl chloride (PVC).

3. The pointing device according to claim 2 further comprising an aperture having an opening through which the speckle light passes, wherein the longitudinal direction of the opening lies in the direction of the angle of incidence so that the speckle light from the front surface overlaps with the speckle light from the rear surface on the detector.

4. The pointing device according to claim 3 wherein the opening is a rectangular opening extending in the longitudinal direction or a slit having an opening in the longitudinal direction.

5. The pointing device according to claim 3 further comprising an optical filter or a lens between the aperture and the substrate.

6. The pointing device according to claim 1 further comprising an aperture having an opening through which the speckle light passes, wherein the longitudinal direction of the opening lies in the direction of the angle of incidence so that the speckle light from the front surface overlaps with the speckle light from the rear surface on the detector.

7. The pointing device according to claim 6 wherein the opening is a rectangular opening extending in the longitudinal direction or a slit having an opening in the longitudinal direction.

8. The pointing device according to claim 6 further comprising an optical filter or a lens between the aperture and the substrate.

9. The pointing device according to claim 1 further comprising a lens for focusing or diffusing the incident light from the light source.

10. The pointing device according to claim 9 wherein the light source is a laser light source.

11. The pointing device according to claim 10, wherein the laser light source is a vertical cavity surface emitting laser.

* * * * *